United States Patent [19]

Bohnen et al.

[11] Patent Number: 4,673,779
[45] Date of Patent: Jun. 16, 1987

[54] LOW-VOLTAGE CIRCUIT BREAKER INCLUDING A CURRENT TRANSFORMER

[75] Inventors: Peter Bohnen; Günter Prietzel; Reinhard Kugler, all of Berlin, Fed. Rep. of Germany

[73] Assignee: Siemens Aktiengesellschaft, Munich, Fed. Rep. of Germany

[21] Appl. No.: 821,849

[22] Filed: Jan. 23, 1986

[30] Foreign Application Priority Data

Feb. 7, 1985 [DE] Fed. Rep. of Germany ....... 3504423

[51] Int. Cl.⁴ ............................................. H01H 33/12
[52] U.S. Cl. ................................................ 200/146 R
[58] Field of Search ............ 200/293, 304, 305, 146 R

[56] References Cited

U.S. PATENT DOCUMENTS 3,584,170 6/1971 Bould ................................. 200/146

FOREIGN PATENT DOCUMENTS 0068934 1/1983 European Pat. Off. .
0071385 2/1983 European Pat. Off. .

Primary Examiner—Mark O. Budd
Attorney, Agent, or Firm—Kenyon & Kenyon

[57] ABSTRACT

A low-voltage circuit breaker comprises a current transformer which at least partly encloses a first connecting bar and is supported by a stationary carrier independently of a second connecting bar. In the region opposite this support, the current transformer is disposed between an L-shaped carrier (angled-off), of the contact arrangements of the circuit breaker and an insulating piece inserted between the connecting bars. In this arrangement, the current transformer can be exchanged with a relatively small amount of labor, while at the same time, adequate strength of the connecting bars against forces is achieved which are introduced into the connecting bars by the continuing current bars.

4 Claims, 3 Drawing Figures

LOW-VOLTAGE CIRCUIT BREAKER INCLUDING A CURRENT TRANSFORMER

BACKGROUND OF THE INVENTION

The present invention relates to a low-voltage circuit breaker having a carrier for a contact arrangement and connecting bars, as well as having a current transformer surrounding one of the connecting bars and wherein the carrier is designed angled-off for accommodating the current transformer.

A circuit breaker of this type has become known from U.S. Pat. No. 3,584,170. Due to the angled-off shape (L-shape) of the carrier, the connecting bars of the circuit breaker on the back side have unequal lengths. At the longer connecting bar which is surrounded by the current transformer, the forces applied at the connecting points therefore are applied with a longer lever arm. This can lead to a large stress of the connecting bars and the carrier of the contact arrangements, especially if the circuit breaker is permanently installed in a switching system.

This difficulty could be corrected by increasing the strength of the circuit breaker in the vicinity of the connecting bars in such a manner that the current transformer is embedded in the material of the carrier of the contact arrangements and thereby, the free length of the connecting bar enclosed by the current transformer is substantially shortened. Then, the current transformer could, of course, no longer be exchanged as is demanded in practice for unconditional employment of the circuit breakers.

SUMMARY OF THE INVENTION

Starting from the known arrangement, it is an object of the invention to provide an accommodation of the current transformer in the circuit breaker which on the one hand permits a replacement with justifiable effort, but on the other hand provides great strength in the vicinity of the connecting bars.

The above and other objects of the present invention are achieved by the provision that the current transformer is supported on a stationary part of the circuit breaker independently of the connecting bar assigned to the current transformer, as well as by an insulating piece which is inserted between the connecting bars and contains tapped holes for clamping screws of the connecting bars. The insulating piece stiffens the connecting bars such that they can take up, without the danger of damage, substantially large forces which stem from the continued bus bars. If the current transformer is to be replaced, it is substantially sufficient to remove this insulating piece in order to make the current transformer accessible.

Because the current transformer is supported independently of the connecting bar, it is particularly easy to remove the transformer from the circuit breaker and to insert it into the latter. In this connection it turns out to be advantageous to support the current transformer standing on the mentioned stationary part of the circuit breaker and to make the arrangement so that the insulating piece, together with the carrier of the contact arrangements, forms a pocket for receiving the part disposed opposite the part of the current transformer which is supported stationary. This substantially formed-locking mounting of the current transformer in the circuit breaker turns out to be sufficient although the current transformers are relatively heavy components due to the iron core and the windings disposed thereon and are subjected to not inconsiderable mechanical stresses due to the switching shocks of the circuit breaker.

A cross piece connecting the side walls of the circuit breaker can serve as the stationary part for supporting the current transformer. Since such a cross piece is generally part of the customary circuit breakers, it is sufficient for a present purpose to adapt the dimensions of fastening elements of the current transformer to the position of such a cross piece, or to attach the cross piece in such a manner as is advantageous for supporting the current transformer without jeopardizing its other functions. The current transformer may comprise two coil forms which are intended to be slipped on a rectangular iron core and which are provided in a symmetrical arrangement with mounting points for base parts. This has the advantage that the coil form for two windings of the current transformer can be composed of form sections of half the size, the shape of which is simplified by the fact that the complete base parts are omitted. The latter can be made more simply as small individual parts which are attached at the mounting points of the coil forms. It is advisable in this connection to provide the mounting points of the coil forms and the base parts with mating projections and undercuts.

Due to the described location of the current transformer which is gripped with its region opposite the base parts between the carrier and the contact arrangements and the insulating piece inserted between the connecting bars, a relatively simply detachable fastening arrangement in the region of the base part is sufficient. This fastening arrangement may consist in that the stationary part of the circuit breaker, and in particular the mentioned cross piece, has holes, accessible from below, for fastening elements engaging the current transformer, for instance, one screw for each base part.

As already mentioned, a substantial stiffening of the connecting bars is obtained already by the mere insertion of the insulating piece. Additional stiffening can be achieved by fastening the insulating piece detachably to a stationary part of the circuit breaker with freely accessible fastening elements. This can be accomplished by bolting the insulating piece to mounting locations of the side walls for the circuit breaker provided for this purpose, or by providing the carrier of the contact arrangement with tapped holes in order to fasten the insulating piece to the carrier.

BRIEF DESCRIPTION OF THE DRAWINGS

The invention will be explained in greater detail in the following detailed description with reference to the drawings, in which.

DETAILED DESCRIPTION

Figure 1:
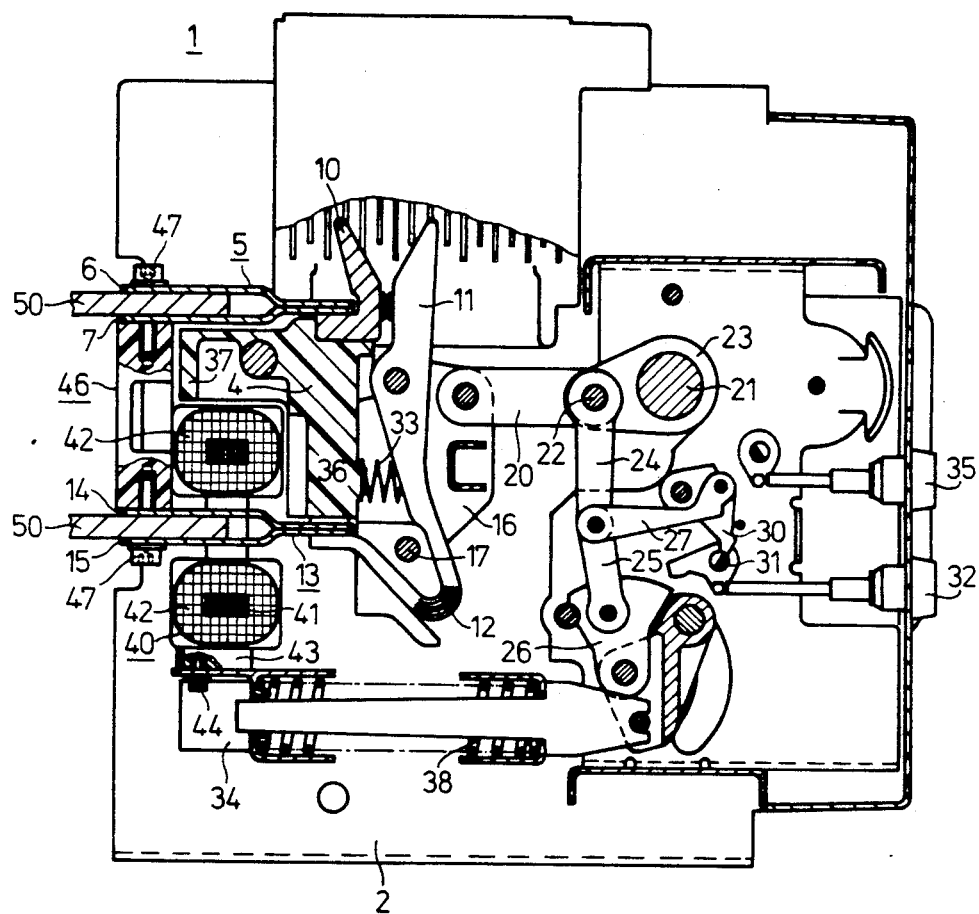
FIG. 1 shows a circuit breaker according to the invention in cross section.
Figure 2:
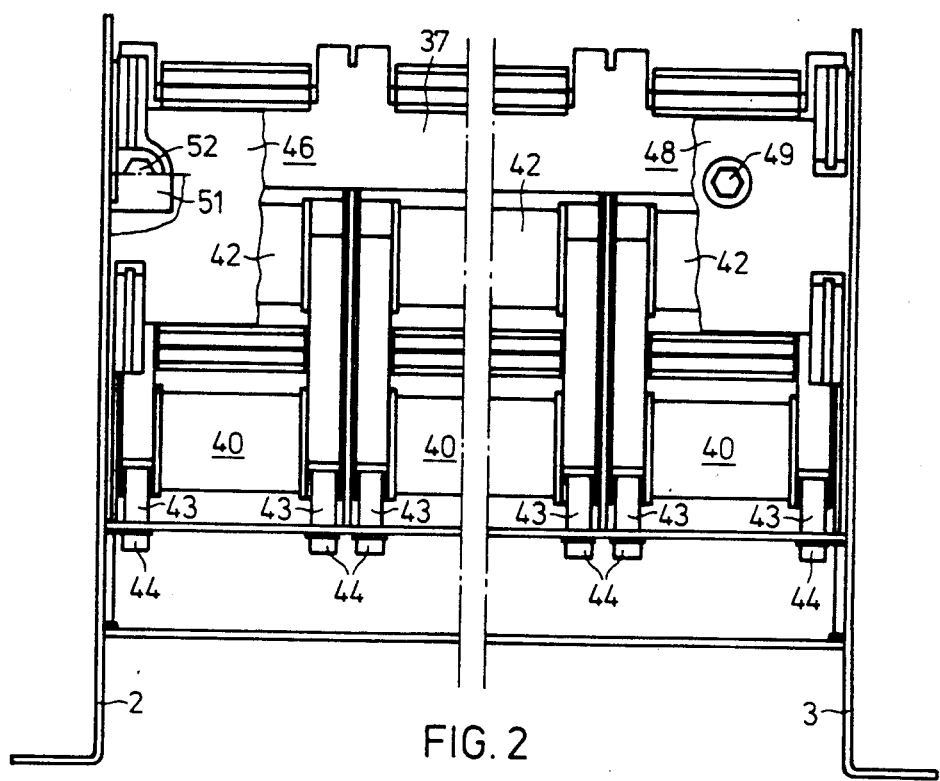
FIG. 2 shows the circuit breaker from the rear where on both sides of a center line shown dash-dotted, different designs of an insulating piece inserted between the connecting bars are shown.

With reference now to the drawings, the low-voltage circuit breaker 1 of FIG. 1 is shown simplified in a cross section through a pole and the control cam. The circuit breaker 1 has, as supporting parts, two side walls 2 and 3, of which one side wall 2 is visible in FIG. 1, while both side walls 2 and 3 are shown in FIG. 2. Between the side walls 2 and 3 extends an insulating carrier 4 for three adjacent contact arrangements. The current path of each pole comprises, starting from an upper, forked connecting bar 5 with bar sections 6 and 7, a stationary contact 10, a movable switching lever 11, a flexible current ribbon 12 as well as a lower connecting bar 13 which is likewise composed of bar sections 14 and 15. The contact lever 11 is movably supported at a contact carrier 16 which can pivot about a stationary pivot 17. The contact carrier 16 is engaged with the interposition of a coupling rod 20 by a control shaft 21 supported in the side walls 2 and 3. The connecting joint 22 between the control shaft 21 or a lever 23 mounted thereon and the coupling rod 20 is engaged by a toggle switch arrangement of three movably linked toggle levers 24, 25 and 26 which is supported in the "on" position of the circuit breakers by a support lever 27 and a ratchet lever 30 at a half-shaft 31. Rotation of the half-shaft 31 by a tripping device not shown or by hand through a push button 32 cancels the support of the toggle lever system and causes the latter to buckle. The contact carrier 16 and the contact lever 11 then assume the "off" position under the influence of a compression spring 33.

The energy required for switching on is stored in a manner not shown in detail, by cocking one or several coil compression springs 38 which are braced with their one end against a cross piece 34 connecting the side walls 2 and 3 and which act with their other end on the lower toggle lever 26. The cocked compression spring 38 can be locked in a manner known per se, and a further push button 35 is provided for releasing thereby this latch and therefore, for switching on the circuit breaker.

As is further shown in FIG. 1, the carrier 4 consisting of insulating material is designed angled-off, the one leg 36 of the coil form having fastening means for securing the connecting bars 5 and 13 on the switch side. The further leg 37 of the carrier 4 is designed so that it corresponds approximately to the dimension of a current transformer 40 in the longitudinal direction of the connecting bars. The current transformer has an iron core 41 which supports a coil form consisting of two form sections 32.

Figure 3:
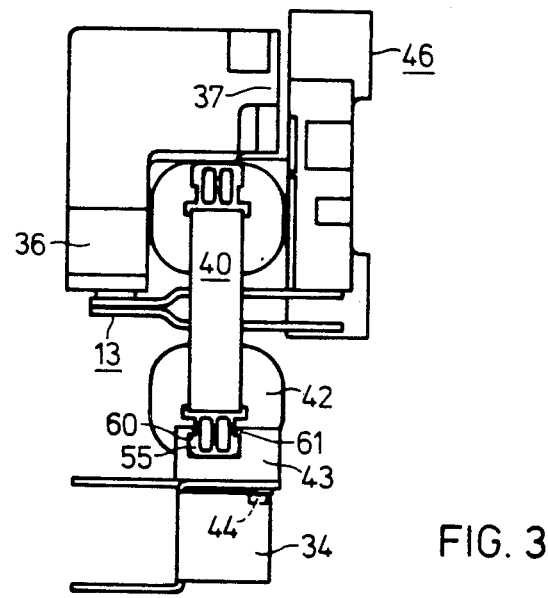
FIG. 3 is a side view of a current transformer and adjacent parts of a circuit breaker according to the invention.

The current transformer 40 surrounds the lower connecting bar 13 of the circuit breaker 1 with spacing and is supported independently of this connecting bar. As shown in FIG. 2, three like current transformers 40 are provided, corresponding to the three-pole design of the circuit breaker 1. The lower coil form section 42 of each of these current transformers is provided with base parts 43. With these, the current transformers rest on the cross piece 34, in which there are through-holes, not shown, for fastening screws 44, for each base part 43. The cross piece 34 is designed such that there is unimpeded access to the fastening screws 44 from below, as is shown particularly by FIGS. 1 and 3.

The current transformer 40 is further secured at its part opposite the base parts, 43, i.e., in the vicinity of the upper coil body section 42. This purpose is served by an insulating piece 46 which is inserted between the connecting bars 5 and 13. The insulating part 46 is shown partly in cross section in FIG. 1 in order to make the clamping screws 47 engaging the insulating piece visible, which are provided for connecting continuing current bars 50 to the connecting bars 5 and 13. In FIG. 1, the connecting bars 50 are shown broken off and the bar sections 6, 7 and 14, 15 respectively, extend beyond them. As will be seen, the insulating piece 46 forms a strong stiffening of the connecting bars 5 and 13. At the same time it fixes the current transformer 40 with little tolerance.

In the example according to FIG. 1, spacing will be recognized between the insulating piece 46 and the upper leg 37 of the carrier 4. The reason for this is that the insulating piece 46 is not connected directly to the carrier 4, but is bolted at its ends to abutments of the side walls 2 and 3, as is shown in the left part of FIG. 2. As shown, a support bent out of the one side wall is designated with 51, and a connecting screw with 52. This arrangement is similarly provided at both side walls 2 and 3.

As a further possibility for fastening an insulating piece, the connection to the carrier 4 is shown in the right part of FIG. 2. To this end, the insulating piece 48 is fastened to the leg 37 with screws 49. This leg is provided with tapped holes, not shown, for instance, one in the center of each pole. In this case the space, shown in FIG. 1 and already mentioned, between the leg 37 and the insulating piece 46 is omitted. The distance between the insulating piece 48 and the leg 36 of the carrier 4 is designed, however, according to the dimensions of the current transformer 40.

As already mentioned, the current transformer 40 contains an iron core 41 as well as two coil form sections 42. According to FIG. 3, these are provided as mounting points 55 for the base parts 43 and thus can be employed selectably as the upper or lower coil form section, the one mounting point remaining unused. The mounting points 55 are provided with undercuts 60 which correspond to projections 61 of the base parts 43. In this manner, the base parts 43 can be anchored to the coil forms in a form-locking manner.

In the foregoing specification, the invention has been described with reference to specific exemplary embodiments thereof. It will, however, be evident that various modifications and changes may be thereunto without departing from the broader spirit and scope of the invention as set forth in the appended claims. The specification and drawing are, accordingly, to be regarded in an illustrative rather than in a restrictive sense.

What is claimed is:

1. A multiple pole low-voltage circuit breaker comprising:
   upper and lower connecting bars for connecting a contact arrangement of each pole of the circuit breaker to a current circuit;
   an insulating carrier arranged between side walls of the circuit breaker for supporting the contact arrangements and connecting bars of all the poles;
   a current transformer provided for each pole, the current transformer at least partly enclosing one of said connecting bars and being supported upright independently of said connecting bars by a cross piece connecting said side walls;
   an insulating piece inserted between said upper and lower connecting bars and attached to said upper and lower connecting bars, said insulating piece having tapped holes for receiving clamping screw means whereby said insulating piece is clamped to said connecting bars by said clamping screw means, said insulating piece and said insulating carrier forming a pocket for receiving a part of said current transformer disposed opposite a part of said current transformer supported by said cross piece.

2. The low-voltage circuit breaker recited in claim 1, wherein the current transformer comprises a rectangular iron core and two like coil forms which have mounting points for base parts arranged symmetrically, and wherein the mounting points of the coil forms and the base parts are provided with interacting projections and undercuts.

3. The low-voltage circuit breaker recited in claim 2, wherein a cross piece has on a back side thereof holes, accessible from below said cross piece for fastening elements engaging the current transformer.

4. The low-voltage circuit breaker recited in claim 1, wherein the insulating piece is fastened detachably to the side walls of the circuit breaker by freely accessible fastening means.

* * * * *